Figure 1:
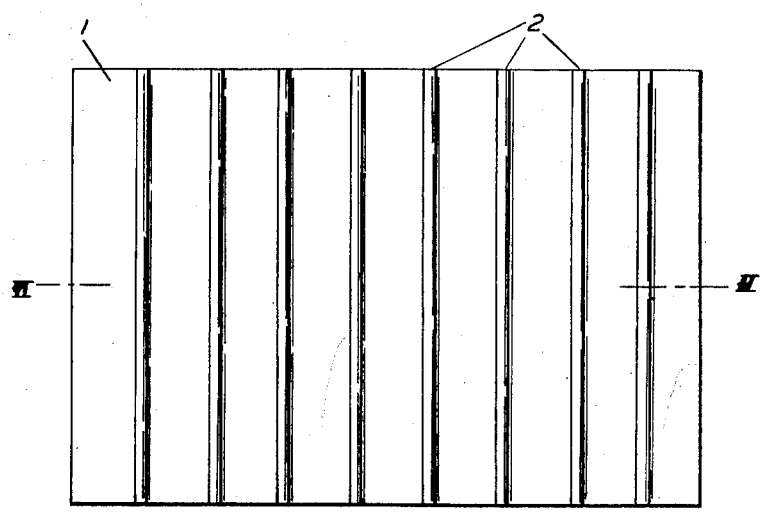

March 30, 1954  F. BOOTH  2,673,887

MANUFACTURE OF SEPARATORS FOR ELECTRIC BATTERIES

Filed March 16, 1949

Inventor
FRANK BOOTH
By
Attorney

Patented Mar. 30, 1954

2,673,887

UNITED STATES PATENT OFFICE 2,673,887

MANUFACTURE OF SEPARATORS FOR ELECTRIC BATTERIES

Frank Booth, Denton, near Manchester, England, assignor, by mesne assignments, to The British Fibrak Separator Company Limited, Denton, near Manchester, England, a corporation of Great Britain Application March 16, 1949, Serial No. 81,831

Claims priority, application Great Britain March 17, 1948

6 Claims. (Cl. 136—145)

This invention relates to the manufacture of separators for accumulators.

Separators of glass fibres have been used with good results but they have the objections of having little tensile strength even when thick, and of the fibres not being close enough together to form effective filters for lead particles. Hence they have been used in conjunction with a wood or similar separator.

The main object of the present invention is to devise a glass fibre separator, which, even in thicknesses of the order of $\frac{1}{100}$ inch, has sufficient tensile strength to enable it to be used alone, which acts as an effective filter for lead particles, thus preventing the development of short circuits.

Another object of the invention is the production of a glass fibre stuff which can be readily cut up to form accumulator separators.

The present invention comprises a method of manufacturing glass fibre stuff for use in making separators, characterized by adding to glass fibres a small proportion of a paper pulp, sufficient to give the desired tensile strength, together with a wet strength agent substantially in a proportion of 6% by volume, and producing from the fibrous mixture a web of sheet material, drying the web and then impregnating it with a polymerisable phenolic resin to impart acid resisting qualities to the pulp, pressing the web to form ribs therein and to squeeze out excess resin, drying the web or lengths cut therefrom and polymerising the resin therein.

The paper pulp employed is preferably either cellulose pulp or kraft pulp.

Since the glass fibres employed are maintained in a compressed condition, they act as effective filters for particles of lead oxide and thus prevent the development of short circuits.

The polymerised stuff thus produced may be stored but is immersed in a wetting solution and then dried before use. The invention covers the production of the stuff whether or not it has been treated with a wetting solution.

Preferably, a rubber phenolic resin such as that sold under the trade name of "Vulcabond" is used as the wet strength agent in the glass fibre pulp mixture.

The invention further comprises the compressed glass fibre stuff produced as described, and also comprehends a separator for an electric accumulator comprising an intimate mixture of glass fibres and paper pulp in which the glass fibres predominate and which is rendered acid-resisting by incorporation of a phenolic resin in the fibrous mixture.

The stuff may be manufactured in an ordinary papermaking machine, and the addition may be cellulose or kraft pulp.

The mixtures employed according to the invention comprised preferably 50/70% of fine glass fibres of a diameter which may vary between .0002 and .0006 inch diameter, but preferably of the smaller diameter, 44/24% of cellulose pulp or kraft pulp and substantially 6% of a wet strength agent such as a rubber phenolic resin aforesaid.

Figure 2:
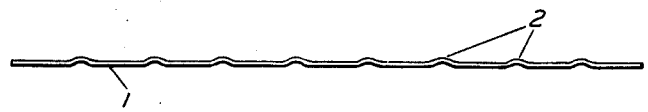

In order that the invention may be more clearly understood, reference is made to the accompanying drawing, in which Fig. 1 illustrates diagrammatically a plan view of a battery separator sheet, Fig. 2 being a section taken along the line II—II in Fig. 1.

In the drawing, the separator is shown at 1, and it is furnished at 2 with a series of ribs which are produced upon the pressing of the web of material from which the individual separators are formed.

The amount of cellulose added to the glass fibres is as small as is necessary to give the desired tensile strength. A preferred mixture is 70% of glass fibres, 24% of cellulose or kraft pulp and the stated quantity of substantially 6% of a wet strength agent such as rubber phenolic resin. The glass fibres may be fine fibres, e. g. .00025 inch diameter. This fibrous mixture is treated in a beater to obtain an intimate mixture with the wet strength agent thoroughly dispersed. The fibrous mass so produced is pumped to a stuff vat and transmitted to a conveyor system which passes it between heated rollers by which a web of sheet material is formed in the manner usual in the papermaking art and then dried.

Since the glass fibres have to withstand treatment in a beater, they are preferably of the fine type to avoid undue breakage. Applicants have found fibres of .00025 inch diameter satisfactory.

This glass fibre web or lengths cut therefrom is immersed in a solution of a phenol formaldehyde resin in methylated spirit, in which the concentration is about 60% and the impregnated material is then rolled to form the usual ribs present in a separator, and to squeeze out excess resin in order to minimise internal resistance; satisfactory results have also been obtained by utilising such resin solutions of concentration of 50% to 70%.

The rolled material is then cut to separator size and subjected to thermal treatment whereby the resin is cured.

After curing, the separator material is immersed in a weak (1-5%) solution of a wetting agent, such as sulphonated Turkey red oil, after which the material is dried at or below a temperature of 100° C. Experiments have shown that the period of immersion can vary from 5 to 15 minutes.

The solution of phenol-formaldehyde resin may vary in concentration from 25% to full concentration, but concentrations of from 50% to 70% have been found to give the best results.

By the present invention a glass fibre separator is provided having good tensile strength, whilst retaining the acid-resisting properties to make it suitable for use as a battery separator; moreover, the glass fibres in the separator are held closely together and anchored in this way by the cellulose-phenolic resin additions or kraft-phenolic resin additions. The additions fill in even the interstices between the fine glass fibres, thus providing a filter for the very fine lead particles and preventing the development of short circuits, hence separators constructed according to the present invention do not require the presence of ancillary means of giving strength or filter qualities in the separator.

I claim:

1. A separator for an electric accumulator, comprising a sheet composed of intimately mixed glass fibres and a cellulose paper pulp, and substantially 6% by volume of a phenolic resin wet strength agent incorporated in the fibre and pulp mixture, the glass fibres predominating in the mixture, said sheet being subsequently impregnated with an acid resisting phenolic resin polymerised after the impregnation and being treated with a wetting solution.

2. A separator for an electric accumulator, comprising a sheet composed of intimately mixed glass fibres and a cellulose paper pulp, and substantially 6% by volume of a phenolic resin wet strength agent incorporated in the fibre and pulp mixture, the glass fibres predominating in the mixture, said sheet being subsequently impregnated with an acid resisting phenolic resin polymerised after the impregnation and being treated with a wetting solution, and ribs on at least one side of said sheet and integral therewith.

3. A separator for an electric accumulator, comprising a sheet composed of substantially 50 to 70% of glass fibres, substantially 44 to 24% of a cellulose paper pulp, and substantially 6% of a phenolic resin wet strength agent, said sheet being impregnated with an acid resisting phenolic resin polymerised after the impregnation and being treated with a wetting solution, and ribs on at least one side of said sheet and integral therewith.

4. A separator for an electric accumulator, comprising a sheet composed of substantially 70% of glass fibres, substantially 24% of a cellulose paper pulp, and substantially 6% of a phenolic resin wet strength agent, said sheet being impregnated with an acid resisting phenolic resin polymerised after the impregnation and being treated with a wetting solution, and ribs on at least one side of said sheet and integral therewith.

5. A separator for an electric accumulator as claimed in claim 4, in which said glass fibres have a diameter of between 0.0002" and 0.0006".

6. A separator for an electric accumulator as claimed in claim 4, in which said glass fibres have a diameter of 0.00025".

FRANK BOOTH.

References Cited in the file of this patent

UNITED STATES PATENTS

| Number | Name | Date |
| --- | --- | --- |
| 1,160,365 | Baekeland | Nov. 16, 1915 |
| 1,716,654 | Moses | June 11, 1929 |
| 1,744,256 | Benner et al. | Jan. 21, 1930 |
| 1,756,035 | Rose | Apr. 29, 1930 |
| 1,790,178 | Sutherland | Jan. 27, 1931 |
| 1,794,194 | Meyercord et al. | Feb. 24, 1931 |
| 1,819,435 | Moses | Aug. 18, 1931 |
| 2,196,469 | Moeller | Apr. 9, 1940 |
| 2,217,005 | Clapp | Oct. 8, 1940 |
| 2,306,781 | Francis, Jr. | Dec. 29, 1942 |
| 2,338,602 | Schur | Jan. 4, 1944 |
| 2,338,839 | Coss | Jan. 11, 1944 |
| 2,383,066 | McDermott | Aug. 21, 1945 |
| 2,394,040 | Callinan | Feb. 5, 1946 |
| 2,478,186 | Gerber | Aug. 9, 1949 |
| 2,482,062 | Hanson | Sept. 13, 1949 |
| 2,504,744 | Sproull et al. | Apr. 18, 1950 |
| 2,531,504 | Dillehay et al. | Nov. 28, 1950 |
| 2,591,755 | Wilson et al. | Apr. 8, 1952 |

FOREIGN PATENTS

| Number | Country | Date |
| --- | --- | --- |
| 804,818 | France | Nov. 3, 1936 |
| 534,618 | Great Britain | Mar. 12, 1941 |

OTHER REFERENCES

Manufacture of Pulp Paper, published by McGraw Hill, New York, 3rd Ed., vol. V., sec. 6, p. 27, 1939.

Collins, Paper Industry & Paper World, June 1943, pp. 263–269.

Britt, "Wet Strength Paper," the Paper Industry and Paper World, April 1944, pp. 37–41 and 46.

Robertson, Chemistry & Ind., April 6, 1946, p. 146.

Searer, Rubber Age, vol. 62, pages 191–193, 1947.